(12) United States Patent
Mitchell et al.

(10) Patent No.: US 6,308,287 B1
(45) Date of Patent: Oct. 23, 2001

(54) TRANSACTION PROCESSING SYSTEM, METHOD AND COMPUTER PROGRAM PRODUCT

(75) Inventors: Ian James Mitchell, Eastleigh; Steven Powell, Winchester, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/185,256

(22) Filed: Nov. 2, 1998

(30) Foreign Application Priority Data

Oct. 19, 1998 (GB) .................................................. 9822807

(51) Int. Cl.⁷ ...................................................... G06F 11/00
(52) U.S. Cl. ................................ 714/19; 714/20; 707/202
(58) Field of Search ................................. 714/19, 20, 49; 707/202; 709/328

(56) References Cited

U.S. PATENT DOCUMENTS

| | | |
|---|---|---|
| 5,165,031 | 11/1992 | Pruul et al. |
| 5,437,026 | 7/1995 | Borman et al. |
| 5,524,241 | 6/1996 | Ghoneimy et al. |
| 5,850,507 * | 12/1998 | Ngai et al. .............................. 714/16 |
| 6,012,094 * | 1/2000 | Leymann et al. ..................... 709/230 |
| 6,035,301 * | 3/2000 | Siegel et al. .......................... 707/102 |
| 6,092,084 * | 7/2000 | Clark et al. ........................... 707/202 |
| 6,154,847 * | 11/2000 | Schofield et al. ......................... 714/4 |
| 6,157,927 * | 12/2000 | Schaefer et al. ..................... 707/103 |

FOREIGN PATENT DOCUMENTS

| | | |
|---|---|---|
| 0 236 743 A2 | 9/1987 | (EP) . |
| 0402542 A | 12/1990 | (EP) . |
| 0457109 A | 11/1991 | (EP) . |
| 0 554 854 A2 | 8/1993 | (EP) . |

OTHER PUBLICATIONS

Reuter et al., "Contracts Revisited" in Advanced Transaction Models and Architectures, 1997, pp 127–151.

Waechter et al., "The ConTract Model" in Database Transaction Models for Advanced Applications, pp 220–263.

* cited by examiner

*Primary Examiner*—Robert Beausoleil
*Assistant Examiner*—Scott T. Baderman
(74) *Attorney, Agent, or Firm*—Louis P. Herzberg

(57) ABSTRACT

A transaction processing method, system and computer program product for processing applications comprising multiple component transactions. A transaction failure of a component transaction causes a reliable admission of failure by means of a failure indicator to be made available to one or more further transactions. The failure indicator is stored in recoverable storage, so that its effect can survive system failure and recovery.

19 Claims, 3 Drawing Sheets

TRANSACTION PROCESSING SYSTEM, METHOD AND COMPUTER PROGRAM PRODUCT

FIELD OF THE INVENTION

This invention relates to the field of transaction processing for data processing systems, and particularly to the processing of applications comprising multiple component transactions.

BACKGROUND OF THE INVENTION

In the field of transaction processing, transactions are generally required to have what are known as the ACID properties. ACID is an acronym representing the four transaction properties of: Atomicity, Consistency, Isolation and Durability. Atomicity requires that all the operations of the transaction must occur or none must occur. Consistency requires a transaction to maintain the consistency of the database. Isolation requires a transaction not to read the intermediate results of another transaction. Durability requires the results of a committed transaction to be made permanent. For background information on the ACID properties, see *Transaction Processing: Concepts and Techniques*, J. Gray and A. Reuter, which is hereby incorporated by reference.

Large enterprise applications implemented using an Online Transaction Processing (OLTP) system will typically use a number of individual ACID transactions to implement a function that the business regards as a complex, but coherent update to business data. It is not possible simply to implement the business transaction as a single ACID transaction because of data and resource sharing requirements in the OLTP environment.

This mismatch between the transaction processing system's notion of a transaction and that of the business analyst has become greater as applications have grown more and more complex. It has forced on the application developer additional complexity to coordinate a collection of transactions so that they behave as required by the business analyst.

Coordination of transactions is mainly handled by the ingenuity of the application designer using the standard Application Programming Interface (API) of the transaction processing system. The application will need to maintain some state data to record progress through the collection of transactions, and each individual transaction will need a means to provoke the next and so make progress. This provocation is a form of signaling.

Application progress state data can be managed in a number of ways. For example, it can be made recoverable by storing it in the database chosen for the application. It is good practice to isolate this 'working storage' of the application from the enterprise data with a longer lifetime (e.g. customer records).

Where the progress through the application is primarily driven by end user actions, the series of transactions may be termed a 'pseudo-conversation'. Input from the end user's terminal is taken as the signal for the next transaction to be initiated. Normally, some state data is passed to the newly-initiated transaction. In a well-known transaction processing system, IBM's CICS (CICS is a registered trademark of International Business Machines Corporation), the state data is simply a piece of virtual storage associated with the user's terminal ('pseudo-conversational COMMAREA').

The facilities available to the application to programmatically signal progress through the series of transactions can be very limited and the ACID properties of each of the transactions are inhibitors because of the need for business applications comprising multiple component transactions to continue to progress even if one of the component transactions fails; this is because the Isolation property means that all the effects of the failing transaction must be reversed, or "backed out".

Typically, a transaction processing system's API includes a command to cause the execution of another transaction, and one way in which application programmers have tried to overcome the above limitations is by use of this START command. In the CICS API there is the START command. The START command allows an application program executing in one transaction to cause another transaction to be created and begin execution. The command creates a request to run a transaction; this request is called an ICE (Interval Control Element). Data may be passed from the originating transaction to the new one. The START command allows a PROTECT parameter that is used to specify the recovery characteristics of the effect of the command.

A protected START has ACID properties: its effects are only committed during a successful forwards commit of the transaction that issued it; the ICE and the data to be passed to the new transaction are stored in a recoverable resource. The result of a committed, protected START request is guaranteed to happen, and happen only once. An unprotected START does not obey ACID transactional semantics. The new transaction is created and begins execution immediately, potentially in parallel with the originating transaction. The ICE and the data are not stored in a recoverable resource. There are no guarantees that the result of an unprotected START command happen, nor that they only happen once.

Use of the START command to provoke progress through the application has limitations. Application programmers have attempted to circumvent these limitations, but this is extremely difficult and unreliable. Using unprotected START commands does not give the level of assurance normally associated with a transactional application. For example, an unprotected START might be used to provoke the next step in an application, but the originating transaction then terminates abnormally and backs out its recoverable updates. The transaction resulting from the unprotected start then has to determine the state of the application, taking into account the fact that some previous step failed. A system restart will lose any pending unprotected START requests, and so lose the thread in the application. Using protected START commands ensures that the progress is in step with the success of the transactions and behaves reasonably across system failures. But the very ACID properties that give these characteristics lead to a different problem that application programmers have to overcome. A protected START results in nothing if the originating transaction performs backout (e.g. in the event of application failure). So it is not possible for an abnormally terminating transaction to actively cause the continuation of the application.

Application programmers may attempt to cope with this case by creating a delayed START request as a 'back-stop' to detect the failure of a particular step. In the case that the transaction commits, the backstop request is redundant and discarded, whereas in the backout case the time interval elapses and the backstop transaction executes—implying that a backout occurred previously. The limitations of this technique are that it increases the complexity of the application progress management, it is not fully reliable over system failure, it is extremely difficult to program since the backstop transaction needs to cope with the varying times it might be executed and whether or not the main transaction has succeeded, and finally the choice of the delay time for the backstop transaction is difficult and limits application progress rate.

In the past, various transaction processing models have been proposed, including models for long-running, extended transactions having nested subtransactions. One model which attempts to deal with the problems of multiple-step transactional applications is the ConTract model, described by Waechter and Reuter in their paper "The ConTract Model", in *Database Transaction Models for Advanced Applications*, edited by A. K. Elmagarmid, which is here incorporated by reference. The ConTract model provides a theoretical framework for business transactions involving the use of sets of flow control and dependency relations between steps under the control of a ConTract managing entity. The paper explicitly states that: "A special kind of global, nested transactions is necessary for structuring the system's work during processing ConTracts". A hierarchical structure of this sort has the disadvantage of introducing a costly extra layer of control into the system. Each such layer adversely affects the performance of the system and increases its complexity. Two layers of programming are defined in the model: the first is the programming of individual steps, and the second is the programming of a controlling "script" to manage transaction flows and dependencies. Again, the introduction of such an additional programming layer disadvantageously increases the complexity of the system.

SUMMARY OF THE INVENTION

Accordingly, in a first aspect, the present invention provides a transaction processing system for processing applications having a plurality of component transactions, comprising: detecting means for detecting failure of a failed component transaction; backout means responsive to said detecting means for backing out said failed component transaction; failure indicator means responsive to said detecting means for indicating failure of said failed component transaction; and recoverable storage means for storing a failure indicator, whereby said failure indicator is reliably made available to a further one or more of said plurality of component transactions.

In other words, a transaction processing system for processing an application consisting of a plurality of component transactions recoverably stores an indication of failure of a component transaction and makes this indication available to other components transactions, independently of the backout processing of the failed transaction.

Thus, the invention enables a later transaction to be passed a reliable admission of failure from a previous, failed transaction. This extension of the traditional scope of transaction processing is useful in the processing of business applications where it is desired that certain activities should continue to process even when a previous activity has failed. The use of recoverable storage means enables the transaction processing system advantageously to preserve the failure indicator after system failure and recovery.

A preferred feature of the first aspect of the invention is to have a transaction processing system as described, wherein said failure indicator reliably made available to said one or more of said plurality of component transactions is capable of triggering said further one or more transactions.

A further preferred feature of the first aspect of the invention is to have a transaction processing system as described, further comprising: creating means for creating filed signals; creating means for creating memory signals in a memory from said filed signals; wherein said failure indicator means generates said failure indicator by modifying one or more of said memory signals. Preferably, the transaction processing system also further comprises: logging means for logging a modified memory signal; suspending means for suspending operation of said backout means during operation of said logging means; and resuming means for resuming operation of said backout means after operation of said logging means.

A further preferred feature of the first aspect of the invention is to have a transaction processing system as described, further comprising: a syncpoint manager operable for processing one or more failure indicators.

In a second aspect, the present invention provides a method for processing an application having a plurality of component transactions, comprising the steps of: detecting a failure of a first transaction; backing out said first transaction in response to said step of detecting a failure; recoverably storing a failure indicator so that it is recoverable after a system failure and recovery; and reliably making said failure indicator available to a further transaction, whereby said further transaction can rely on said failure indicator.

A preferred feature of the second aspect of the invention is that the method provides that said failure indicator reliably made available to said further transaction is capable of triggering said further transaction.

A further preferred feature of the second aspect of the invention is that the method further comprises the steps of: creating one or more filed signals; and creating one or more memory signals in a memory from said one or more filed signals; wherein said failure indicator is generated by modifying one or more of said memory signals.

A further preferred feature of the second aspect of the invention is that the method further comprises the steps of: logging a modified memory signal; suspending said step of backing out during said step of logging; and resuming said step of backing out after said step of logging.

The present invention also provides in a third aspect, A computer program product, stored on a computer-readable storage medium, for carrying out the steps of the method.

BRIEF DESCRIPTION OF THE DRAWINGS

A preferred embodiment of the present invention will now be described by way of example, with reference to the drawings in which.

DESCRIPTION OF THE PREFERRED EMBODIMENTS

Figure 1:
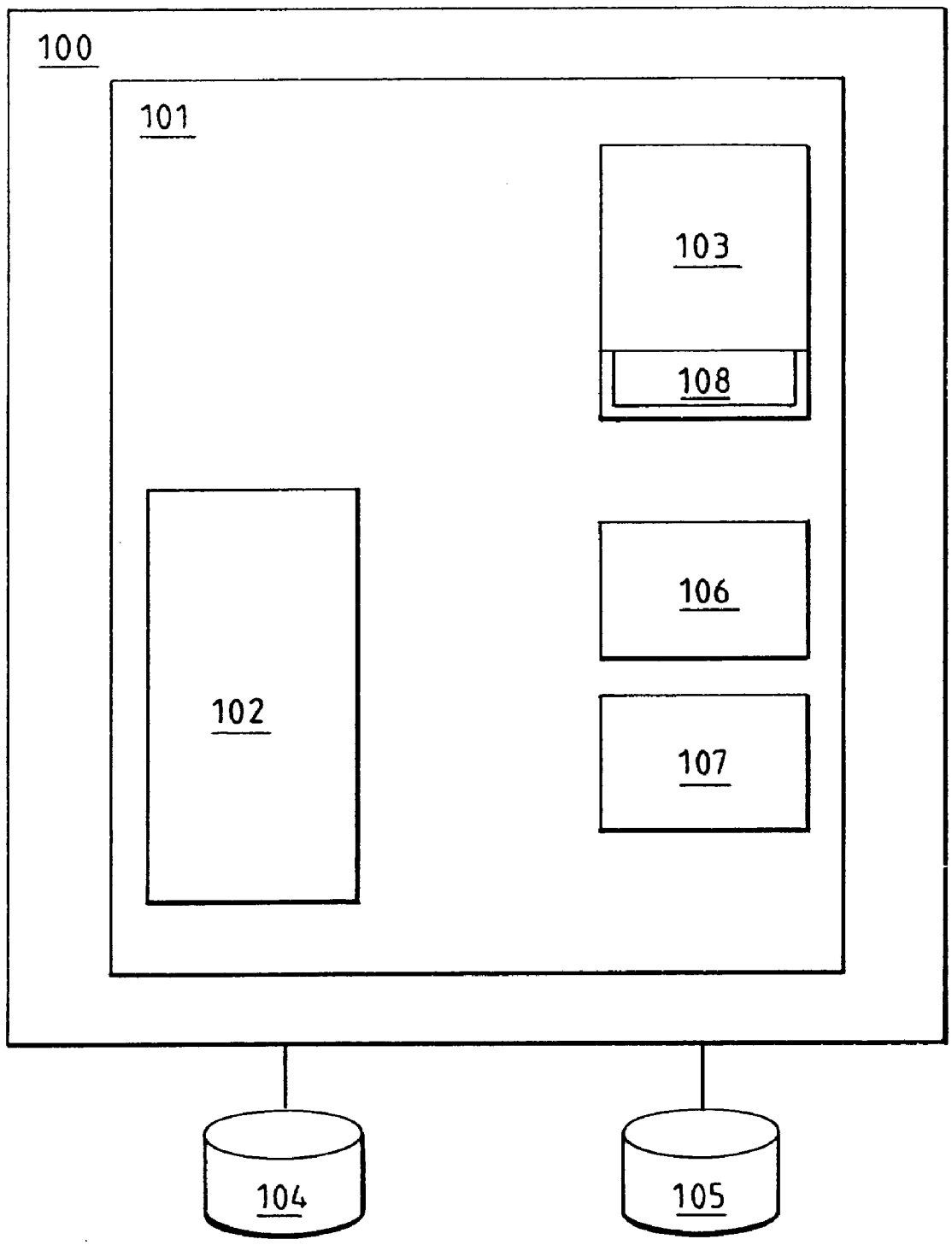
FIG. 1 shows a data processing system according to the present invention.

In FIG. 1 there is shown a data processing system (100) having a transaction processing monitor (101), a main memory (102), a syncpoint manager (103), a log (104), and a recoverable file (105). A first transaction (106) and a further transaction (107) are also shown. The syncpoint manager (103) has an assured signal manager component (108).

In a conventional system of this kind, the ACID properties of transactions ensure that a transaction, such as transaction (106), if it is backed out, has no externally visible effect on recoverable resources, such as recoverable file (105). The present embodiment breaks with this convention by using recoverable file (105) as a signal repository; this is highly desirable because it gives robustness across system failures.

In the present embodiment, assured signals are emitted from transactions, such as transaction (106) in both the commit and backout cases. The commit case is just like a protected START request, as described above. Allowing a signal to be emitted during backout advantageously makes it possible to maintain the flow of the application under all circumstances, without the need for application programmers to use other means to detect failures; backouts can now provoke complex transaction progress. The term 'assured' is used here to distinguish the behaviour from normal transactional behaviour. It is a form of behaviour closely related to the conventional behaviour of transactions, but permits a backout to have a durable outcome. This breakage of the usual isolation property is confined to the signals that pass between transactions. The control of assured signals of the present embodiment is implemented in the assured signal manager component (108) within the syncpoint manager (103), and uses the logging functions of the syncpoint manager in the same way as would a recoverable resource manager. As such the assured signal manager may be thought of as a special sort of resource manager.

A signal, in this context, is information about some work to be done: a request. The request contains enough information for the transaction processing system (101) to create and begin the execution of a new transaction. For example, in CICS terms this information includes the TRANID to be attached and the USERID under whose security attributes the transaction is to execute. In addition to this information, in the present embodiment, the request also carries an indicator of the status of the issuing transaction: whether it has backed out or not.

In the present embodiment, there are potentially three places that an assured signal may reside. Each of these may contain slightly different data and thus the signals are given different names. They are 'filed signals', 'memory signals', and 'logged signals'. The filed signals reside in a recoverable file (105). This means that all updates to filed signals are atomic and isolated with respect to any other transactions in the system. In particular, if the transaction fails and performs backout, any changes it made to the filed signal also backout from the point of view of any other transaction. Filed signals form the base repository for assured signals the contents of which may be augmented by the other types of signal. Each filed signal has an identifier which is sufficient to locate it in the recoverable file; the other types of signal always contain a filed signal identifier.

A transaction is the means by which any durable work is done in a transaction processing system, so each change to a filed signal is done by a transaction. In particular, a transaction will originate a filed signal, and a transaction (normally another transaction) will delete or 'consume' it. In the transaction processing system of the present embodiment there are copies of signals kept in main memory (102) also. These are called 'memory signals'. Each memory signal is associated with a running transaction and is normally kept in step with a corresponding filed signal, except in the case of backout.

Each transaction has records in the log (104), managed by the syncpoint manager (103). When a transaction is performing the work demanded by an assured signal, a copy of the signal (called the 'logged signal') is written to the log for that transaction.

Figure 2:
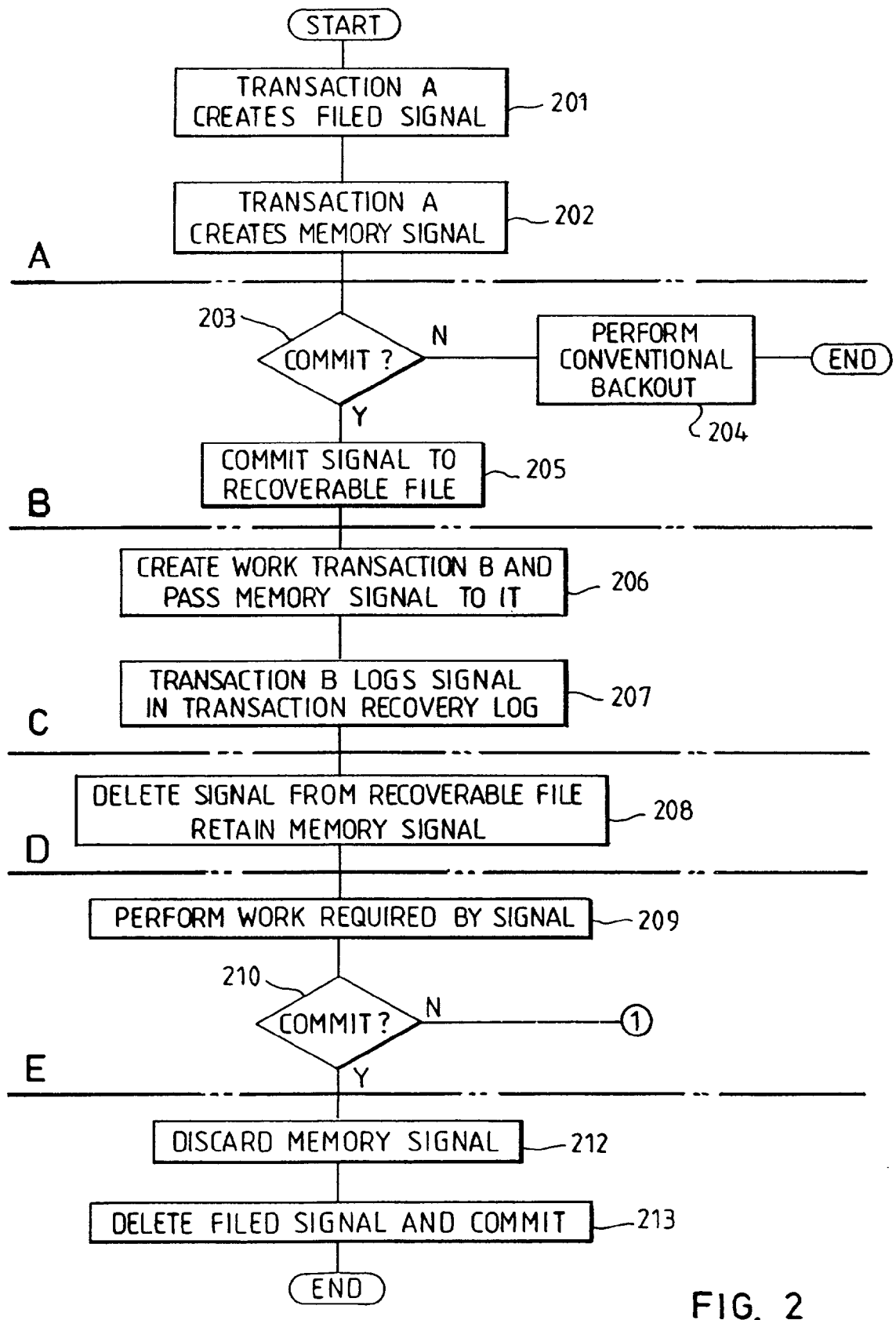
FIG. 2 is a flow chart of a part of a processing method according to the present invention.

Referring now to the flowchart of FIG. 2, when a signal is created by a transaction A, a filed signal is written (201) to the recoverable file in the normal way, and a corresponding memory signal is created (202). If the transaction A that created the signal commits (203), then the signal is committed (205) to the recoverable file and a new transaction B (called the work transaction) is created (206) to perform the work to which the signal refers. If, however, the transaction A that created the signal performs backout (204), the signal does not appear in the recoverable file and the rest of the system ignores it. Transaction B is not created. An advantage of this embodiment is that no changes need to be made to the recoverable file resource semantics.

The work transaction B is designated to perform the work requested by the signal. The memory signal is passed (206) to the work transaction to indicate the work to be done. This transaction will consume the filed signal or else arrange to have it consumed in a further transaction which is synchronised with this transaction. The signal is logged (207), that is, a logged signal is created on the transaction recovery log, so that signal processing can survive system failure. The filed signal is then consumed by being deleted (208) from the recoverable file (by a recoverable action); the memory signal is retained. The work requested by the signal is then performed (209). Subsequently the transaction B either commits (210) because its processing has been successful, or it performs backout in the event of a failure or of a deliberate application decision to abandon the work. These two cases result in different actions during syncpoint processing.

In the event of commit processing, the memory signal is discarded (212) and no other action is necessary. The delete action for the filed signal will, in the normal way, be committed (213), and the filed signal will be permanently removed from the recoverable file: a durable update that is visible to other transactions. No other transactions are caused by this signal, but the fact of its deletion could be used as the starting point for further complex transaction processing.

Figure 3:
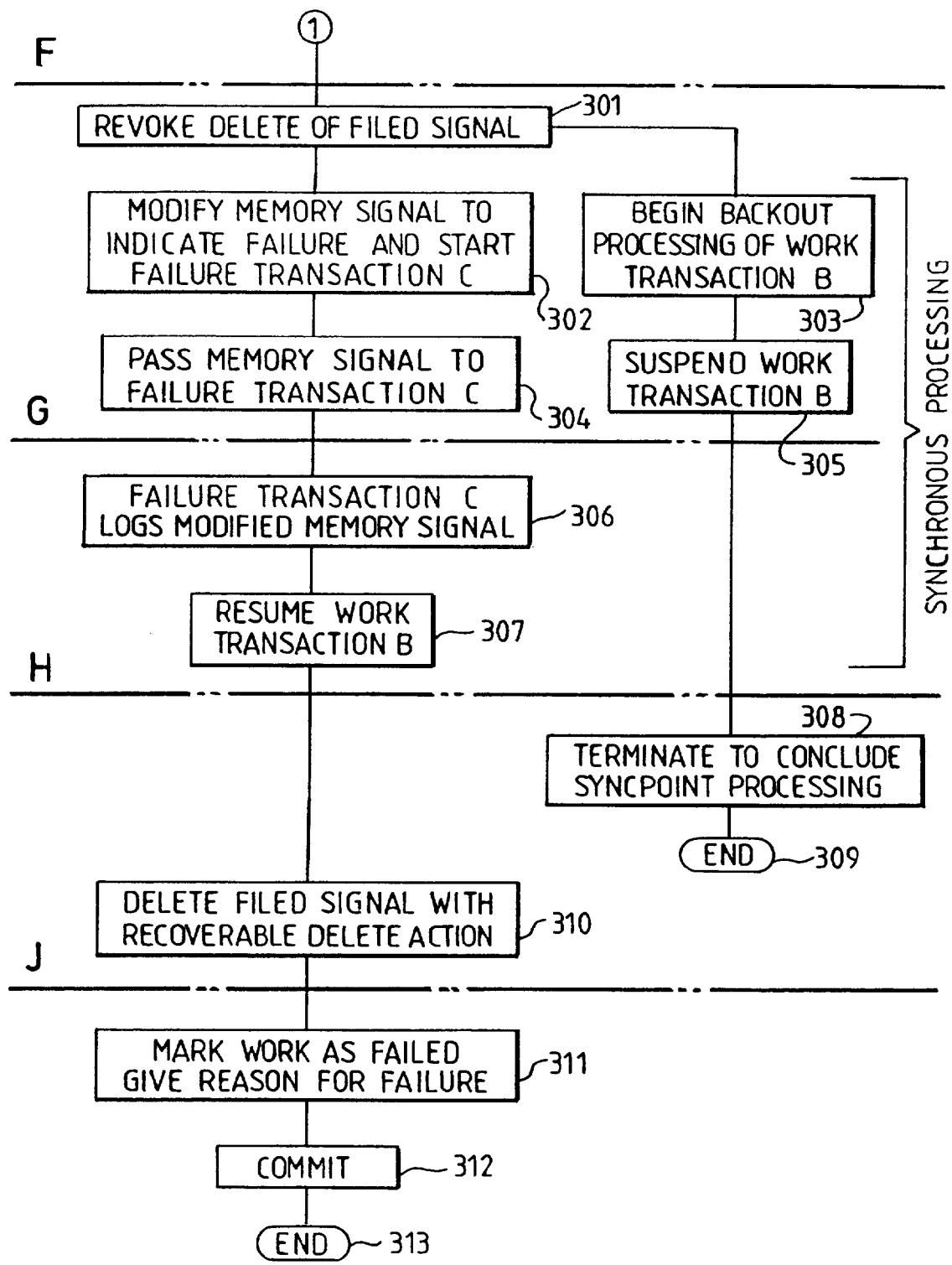
FIG. 3 is a flow chart of a further part of a processing method according to the present invention.

Referring to the flowchart of FIG. 3, in the event of backout processing for a transaction failure, the recoverable delete action for the filed signal will be revoked (301), in the normal way for recoverable files, and the filed signal will not be deleted. The content of the filed signal will be identical with its content when it was created, and this does not include any information about the current transaction B failure. In order to provoke work that depends upon this transaction B failure the memory signal is modified to record the failure and start a 'failure transaction' C (302) to perform work that records the failure. In the present embodiment, the memory signal also records further information about the failure such as error codes and messages. The failure transaction C is started synchronously with the backout processing (303) of the work transaction. The memory signal is not discarded but passed (304) to the failure transaction C for further processing. The work transaction is suspended (305) after the recoverable file backout processing is finished and before backout processing is finished. When the work transaction is resumed (307) by the failure transaction, it can terminate (308) and conclude the syncpoint processing in the normal way.

While the work transaction is suspended, failure transaction C starts by logging (306) the modified memory signal (that is, creating a logged signal which is a copy of the memory signal in the transaction recovery log), so that it can survive system failures. This behaviour is similar to that of the consume processing described above. At this point the work transaction B that originated the failure transaction C is resumed (307). The failure transaction C continues by deleting (310) the filed signal with a recoverable action and then performing failure processing work. This normally consists of marking the work as having failed, and giving the reason (311), and then committing.

The present embodiment advantageously provides reliable processing of signals, as is shown by further reference to the flowcharts of FIG. 2 and FIG. 3, in which the possible system failure points are indicated by lines marked with the letters A, B, etc. to the left of the drawing.

In FIG. 2, system failures may occur at the logical times marked A, B, C, D and E. Each of these is considered in turn to explain how the present embodiment preserves enough information to either retry the work, or to continue to progress as if it were not interrupted.

A Normal transaction and system recovery will ensure that the originating transaction has no effect; in particular the filed signal (placed in a recoverable file) will not appear in that file after backout.

B After commit is decided in the originating transaction a system failure followed by system recovery procedures will result in the filed signal being restored to the recoverable file. It is now possible to retrieve that signal and perform the work it indicates in the usual manner when the system resumes normal work.

C A system failure after the work transaction has logged the signal will ensure that both the filed signal and the logged signal are found during system recovery. These will match and the logged signal is effectively ignored. Processing proceeds as in case B.

D A system failure after the delete filed signal but before commit of the work transaction will still result in the system recovery indicated by cases B and C. The signal remains on the recoverable file (the work transaction, being in flight at system failure, will backout and the delete will be revoked) and can be acted upon when normal system work resumes.

E A system failure after commit of the work transaction will result in system recovery honoring the delete of the filed signal. The transaction log (for that transaction) will be discardable, and the signal is consumed.

Referring to FIG. 3, system failures may occur at the logical times marked F, G, H and J. Each of these is considered in turn to explain how the present embodiment preserves enough information to either retry the work, or to continue to progress as if it were not interrupted.

F The first new system failure point can occur after a backout decision by the work transaction. On system recovery the work associated with the transaction will be backed out. The logged signal will be recovered from the system log and associated with the signal on the recoverable file and backout processing will be resumed. This will restart the failure transaction in the same way as before.

G This failure point is treated identically to F. The existence of the failure transaction may or may not be recognized by system recovery, but in any case will be fully revoked. The work transaction will not have been discarded, and so will fully recover the signal and obligation to record failure from the system transaction log.

H After the failure signal is logged it may be that the work transaction has already been discarded, and so the logged signal is the only record of the obligation to record failure. This is recognized at system recovery by always recovering logged signals, and relating them to filed signals before normal processing is resumed. The overlap between the logged signal and the work transaction of the present embodiment advantageously prevents the loss of vital information in the event of system failure.

J System failure after the failure transaction has deleted the filed signal will either result in backout of the failure transaction (in which case the signal is not consumed and the failure transaction is retried when normal system functions resume), or commit of the failure transaction, in which case the signal may be consumed in the normal way. Normal transaction and system recovery mechanisms deal with these cases.

What is claimed is:

1. A transaction processing system for processing applications having a plurality of component transactions, comprising:

detecting means for detecting failure of a failed component transaction;

backout means responsive to said detecting means for backing out said failed component transaction;

failure indicator means responsive to said detecting means for indicating failure of said failed component transaction;

creating means for creating filed signals;

creating means for creating memory signals in a memory from said filed signals;

wherein said failure indicator means generates said failure indicator by modifying one or more of said memory signals; and recoverable storage means for storing a failure indicator, whereby said failure indicator is reliably made available to a further one or more of said plurality of component transactions.

2. A transaction processing system as claimed in claim 1, wherein said failure indicator reliably made available to said one or more of said plurality of component transactions is capable of triggering said further one or more transactions.

3. A transaction processing system as claimed in claim 1, further comprising:

logging means for logging a modified memory signal;

suspending means for suspending operation of said backout means during operation of said logging means; and resuming means for resuming operation of said backout means after operation of said logging means.

4. A transaction processing system as claimed in claim 2, further comprising:

logging means for logging a modified memory signal;

suspending means for suspending operation of said backout means during operation of said logging means; and resuming means for resuming operation of said backout means after operation of said logging means.

5. A transaction processing system as claimed in claim 1, further comprising:

a syncpoint manager operable for processing one or more failure indicators.

6. A method for processing an application having a plurality of component transactions, comprising the steps of:

detecting a failure a first transaction;

backing out said first transaction in response to said step of detecting a failure;

recoverably storing a failure indicator so that it is recoverable after a system failure and recovery;

creating one or filed more signals;

creating one or more memory signals in a memory from said one or more filed signals;

wherein said failure indicator is generated by modifying one or more of said memory signals; and reliably making said failure indicator available to a further transaction, whereby said further transaction can rely on said failure indicator.

7. A method as claimed in claim 6, wherein said failure indicator reliably made available to said further transaction is capable of triggering said further transaction.

8. A method as claimed in claim 6, further comprising the steps of:
logging a modified memory signal;
suspending said step of backing out during said step of logging; and
resuming said step of backing out after said step of logging.

9. A method as claimed in claim 7, further comprising the steps of:
logging a modified memory signal;
suspending said step of backing out during said step of logging; and
resuming said step of backing out after said step of logging.

10. A computer program product, stored on a computer-readable storage medium, for carrying out the steps of a method for processing applications having a plurality of component transactions, the steps of said method comprising:
detecting a failure of a first transaction;
backing out said first transaction in response to said step of detecting a failure;
recoverably storing a failure indicator so that it is recoverable after a system failure and recovery;
creating one or more filed signals;
creating one or more memory signals in a memory from said one or more filed signals;
wherein said failure indicator is generated by modifying one or more of said memory signals; and
reliably making said failure indicator available to a further transaction, whereby said further transaction can rely on said failure indicator.

11. A computer program product as claimed in claim 10, wherein said method further comprises the step of:
making said failure indicator available to said further transaction as a trigger for said further transaction.

12. A computer program product as claimed in claim 10, wherein said method further comprises the steps of:
logging a modified memory signal;
suspending said step of backing out during said step of logging; and
resuming said step of backing out after said step of logging.

13. A computer program product as claimed in claim 11, wherein said method further comprises the steps of:
logging a modified memory signal;
suspending said step of backing out during said step of logging; and
resuming said step of backing out after said step of logging.

14. A transaction processing system for processing applications having a plurality of component transactions, comprising:
detecting means for detecting failure of a failed component transaction;
backout means responsive to said detecting means for backing out said failed component transaction;
failure indicator means responsive to said detecting means for indicating failure of said failed component transaction;
recoverable storage means for storing a failure indicator, whereby said failure indicator is reliably made available to a further one or more of said plurality of component transactions;
logging means for logging a modified memory signal;
suspending means for suspending operation of said backout means during operation of said logging means; and
resuming means for resuming operation of said backout means after operation of said logging means.

15. A transaction processing system as claimed in claim 14, wherein said failure indicator reliably made available to said one or more of said plurality of component transactions is capable of triggering said further one or more transactions.

16. A method of processing an application having a plurality of component transactions, comprising the steps of:
detecting a failure of a first transaction;
backing out said first transaction in response to said step of detecting a failure;
recoverably storing a failure indicator so that it is recoverable after a system failure and recovery;
reliably making said failure indicator available to a further transaction, whereby said further transaction can rely on said failure indicator;
logging a modified memory signal;
suspending said step of backing out during said step of logging; and
resuming said step of backing out after said step of logging.

17. A method as claimed in claim 16, wherein said failure indicator reliably made available to said further transaction is capable of triggering said further transaction.

18. A computer program product, stored on a computer-readable storage medium, for carrying out the steps of a method for processing applications having a plurality of component transactions, the steps of said method comprising:
detecting a failure of a first transaction;
backing out said first transaction in response to said step of detecting a failure;
recoverably storing a failure indicator so that it is recoverable after a system failure and recovery;
reliably making said failure indicator available to a further transaction, whereby said further transaction can rely on said failure indicator;
logging a modified memory signal;
suspending said step of backing out during said step of logging; and
resuming said step of backing out after said step of logging.

19. A computer program product as claimed in claim 18, wherein said method further comprises the step of:
making said failure indicator available to said further transaction as a trigger for said further transaction.

* * * * *